United States Patent
Panda et al.

(10) Patent No.: US 12,067,082 B2
(45) Date of Patent: Aug. 20, 2024

(54) TEMPORAL CONTRASTIVE LEARNING FOR SEMI-SUPERVISED VIDEO ACTION RECOGNITION

(71) Applicants: International Business Machines Corporation, Armonk, NY (US); Indian Institute of Technology Kharagpur, West Bengal (IN)

(72) Inventors: Rameswar Panda, Medford, MA (US); Rogerio Schmidt Feris, West Hartford, CT (US); Abir Das, West Bengal (IN)

(73) Assignees: International Business Machines Corporation, Armonk, NY (US); Indian Institute of Technology, Kharagpur West Bengal (IN)

( * ) Notice: Subject to any disclaimer, the term of this patent is extended or adjusted under 35 U.S.C. 154(b) by 265 days.

(21) Appl. No.: 17/515,380

(22) Filed: Oct. 29, 2021

(65) Prior Publication Data
US 2023/0138254 A1    May 4, 2023

(51) Int. Cl.
*G06F 18/214* (2023.01)
*G06F 16/783* (2019.01)
(Continued)

(52) U.S. Cl.
CPC ........ *G06F 18/2155* (2023.01); *G06F 16/783* (2019.01); *G06F 18/22* (2023.01);
(Continued)

(58) Field of Classification Search
CPC .... G06F 18/2155; G06F 16/783; G06F 18/22; G06F 18/24; G06N 3/04; G06N 3/08;
(Continued)

(56) References Cited

U.S. PATENT DOCUMENTS 8,001,062 B1    8/2011    Gargi et al.
8,019,702 B1    9/2011    Gargi et al.
(Continued)

OTHER PUBLICATIONS

Ankit Singh, Omprakash Chakraborty, Ashutosh Varshney, Rameswar Panda, Rogerio Feris, Kate Saenko, and Abir Das. Semi-Supervised Action Recognition with Temporal Contrastive Learning. In Proceedings of the IEEE/CVF Conference on Computer Vision and Pattern Recognition 2021 (pp. 10389-10399), arXiv:2102.02751v1, Feb. 4, 2021.

(Continued)

*Primary Examiner* — Christopher M Brandt
(74) *Attorney, Agent, or Firm* — Caleb Wilkes; Otterstedt & Kammer PLLC

(57) ABSTRACT

A base pathway of a computerized two-pathway video action recognition model is trained using a plurality of labeled video samples. The base pathway is trained using a plurality of unlabeled video samples at a first framerate. An auxiliary pathway of the computerized two-pathway video action recognition model is trained using a plurality of the unlabeled video samples at a second framerate, the second framerate being slower than the first framerate, wherein the training of the base pathway and the training of the auxiliary pathway result in a trained computerized two-pathway video action recognition model. A candidate video is categorized using the trained computerized two-pathway video action recognition model and the categorized candidate video is stored in a computer-accessible video database system for information retrieval.

20 Claims, 8 Drawing Sheets

(51) Int. Cl.
G06F 18/22 (2023.01)
G06F 18/24 (2023.01)
G06N 3/04 (2023.01)
G06N 3/08 (2023.01)
G06V 20/40 (2022.01)

(52) U.S. Cl.
CPC .............. *G06F 18/24* (2023.01); *G06N 3/04* (2013.01); *G06N 3/08* (2013.01); *G06V 20/41* (2022.01)

(58) Field of Classification Search
CPC ...... G06N 3/045; G06N 3/0895; G06V 20/41; G06V 10/7753; G06V 10/82; G06V 40/20
See application file for complete search history.

(56) References Cited

U.S. PATENT DOCUMENTS

| | | | |
|---|---|---|---|
| 8,140,451 | B1 | 3/2012 | Gargi et al. |
| 8,209,270 | B2 | 6/2012 | Gargi et al. |
| 2018/0268265 | A1* | 9/2018 | Sohn .................. G06F 18/217 |
| 2021/0406553 | A1* | 12/2021 | Wu .................... G06V 10/75 |
| 2022/0400251 | A1* | 12/2022 | Fisher ................. G16H 50/20 |
| 2023/0196117 | A1* | 6/2023 | Du ..................... G06N 3/0895 382/155 |

OTHER PUBLICATIONS

Ankit Singh, Omprakash Chakraborty, Ashutosh Varshney, Rameswar Panda, Rogerio Feris, Kate Saenko, and Abir Das. Semi-Supervised Action Recognition with Temporal Contrastive Learning. In Proceedings of the IEEE/CVF Conference on Computer Vision and Pattern Recognition 2021 (pp. 10389-10399), arXiv:2102.02751v2, Mar. 29, 2021.

Karen Simonyan and Andrew Zisserman. Two-Stream Convolutional Networks for Action Recognition in Videos. In Neural Information Processing Systems, pp. 1-9, 2014.

Du Tran, Lubomir Bourdev, Rob Fergus, Lorenzo Torresani, and Manohar Paluri. Learning Spatiotemporal Features with 3D Convolutional Networks. In Proceedings of the IEEE international conference on computer vision, pp. 4489-4497, 2015.

Joao Carreira and Andrew Zisserman. Quo Vadis, Action Recognition? A New Model and the Kinetics Dataset. In IEEE Conference on Computer Vision and Pattern Recognition, pp. 6299-6308, 2017.

Kensho Hara, Hirokatsu Kataoka, and Yutaka Satoh. Learning Spatio-Temporal Features with 3D Residual Networks for Action recognition. In IEEE International Conference on Computer Vision Workshops, pp. 3154-3160, 2017.

Christoph Feichtenhofer, Haoqi Fan, Jitendra Malik, and Kaiming He. SlowFast Networks for Video Recognition. In IEEE International Conference on Computer Vision, pp. 6202-6211, 2019.

Limin Wang, Yuanjun Xiong, Zhe Wang, Yu Qiao, Dahua Lin, Xiaoou Tang, and Luc Van Gool. Temporal Segment Networks: Towards Good Practices for Deep Action Recognition In European conference on computer vision, 2016. pp. 20-36.

Bolei Zhou, Alex Andonian, Aude Oliva, and Antonio Torralba. Temporal Relational Reasoning in Videos. In European Conference on Computer Vision (ECCV), pp. 1-16, 2018.

Ji Lin, Chuang Gan, and Song Han. TSM: Temporal Shift Module for Efficient Video Understanding. In IEEE International Conference on Computer Vision, pp. 7083-7093, 2019.

Quanfu Fan, Chun-Fu Richard Chen, Hilde Kuehne, Marco Pistoia, and David Cox. More Is Less: Learning Efficient Video Representations by Big-Little Network and Depthwise Temporal Aggregation. In Neural Information Processing Systems, pp. 1-10, 2019.

Olivier Chapelle, Bernhard Scholkopf, and Alexander Zien. Semi-Supervised Learning (chapelle, o et al., eds .; 2006) [Book Reviews]. Transactions on Neural Networks, 20(3):542-542, 2009.

Augustus Odena. Semi-Supervised Learning with Generative Adversarial Networks. arXiv preprint arXiv: 1606.01583, 2016. pp. 1-3.

Eric Arazo, Diego Ortego, Paul Albert, Noel E O'Connor, and Kevin McGuinness. Pseudo-Labeling and Confirmation Bias in Deep Semi-Supervised Learning. In International Joint Conference on Neural Networks (IJCNN), pp. 1-8. IEEE, 2020.

Philip Bachman, Ouais Alsharif, and Doina Precup. Learning with Pseudo-Ensembles. In Neural Information Processing Systems, pp. 1-9, 2014.

Spyros Gidaris, Praveer Singh, and Nikos Komodakis. Unsupervised Representation Learning by Predicting Image Rotations. arXiv preprint arXiv:1803.07728, 2018. pp. 1-16.

Alexey Dosovitskiy, Jost Tobias Springenberg, Martin Riedmiller, and Thomas Brox. Discriminative Unsupervised Feature Learning with Convolutional Neural Networks. In Neural Information Processing Systems, pp. 1-9, 2014.

Xiaohua Zhai, Avital Oliver, Alexander Kolesnikov, and Lucas Beyer. S4L: Self-Supervised Semi-Supervised Learning. In IEEE International Conference on Computer Vision, pp. 1476-1485, 2019.

Kihyuk Sohn, David Berthelot, Chun-Liang Li, Zizhao Zhang, Nicholas Carlini, Ekin D Cubuk, Alex Kurakin, Han Zhang, and Colin Raffel. Fixmatch: Simplifying Semi-Supervised Learning with Consistency and Confidence. In Neural Information Processing Systems, 2020. Pages 1-13.

Ting Chen, Simon Kornblith, M. Norouzi, and Geoffrey E. Hinton. A Simple Framework for Contrastive Learning of Visual Representations. ArXiv preprint ArXiv:2002.05709, 2020. pp. 1-11.

Daniel Gordon, Kiana Ehsani, Dieter Fox, and Ali Farhadi. Watching The World Go By: Representation Learning from Unlabeled Videos. arXiv preprint arXiv:2003.07990, 2020. pp. 1-20.

Rui Qian, Tianjian Meng, Boqing Gong, Ming-Hsuan Yang, Huisheng Wang, Serge Belongie, and Yin Cui. Spatiotemporal Contrastive Video Representation Learning. arXiv preprint arXiv:2008.03800, 2020. pp. 6964-6974.

Sagie Benaim, Ariel Ephrat, Oran Lang, Inbar Mosseri, William T Freeman, Michael Rubinstein, Michal Irani, and Tali Dekel. SpeedNet: Learning the Speediness in Videos. In IEEE Conference on Computer Vision and Pattern Recognition, pp. 9922-9931, 2020.

Dong-Hyun Lee et al. Pseudo-label: The simple and efficient semi-supervised learning method for deep neural networks. In Workshop on challenges in representation learning, ICML Jun. 1, 20136 (p. 1-6).

Jinwoo Choi et al. Unsupervised and semi-supervised domain adaptation for action recognition from drones. In Proceedings of the IEEE/CVF Winter Conference on Applications of Computer Vision 2020 (pp. 1717-1726).

Peter Mell and Timothy Grance, The NIST Definition of Cloud Computing, NIST Special Publication 800-145, Sep. 2011, cover, pages i-iii and 1-3.

Antti Tarvainen et al. Mean Teachers are Better Role Models: Weight-Averaged Consistency Targets Improve Semi-Supervised Deep Learning Results. In Neural Information Processing Systems, pp. 1-10, 2017.

* cited by examiner

| APPROACH | FIRST CONVENTIONAL BACKBONE | | | SECOND CONVENTIONAL BACKBONE | | |
|---|---|---|---|---|---|---|
| | 1% | 5% | 10% | 1% | 5% | 10% |
| SUPERVISED (8F) | 5.98±0.68 | 17.26±1.17 | 24.67±0.68 | 5.69±0.51 | 16.68±0.25 | 25.92±0.53 |
| PSEUDO-LABEL | 6.46±0.32 | 18.76±0.77 | 25.67±0.45 | 6.66±0.89 | 18.77±1.18 | 28.85±0.91 |
| MEAN TEACHER | 7.33±1.13 | 20.23±1.59 | 30.15±0.42 | 6.82±0.18 | 21.80±1.54 | 32.12±2.37 |
| S4L | 7.18±0.97 | 18.58±1.05 | 26.04±1.89 | 6.87±1.29 | 17.73±0.26 | 27.84±0.75 |
| MIXMATCH | 7.45±1.01 | 18.63±0.99 | 25.78±1.01 | 6.48±0.83 | 17.77±0.12 | 27.03±1.66 |
| FIXMATCH | 6.04±0.44 | 21.67±0.18 | 33.38±1.58 | 6.54±0.71 | 25.34±2.03 | 37.44±1.31 |
| TCL | 7.79±0.57 | 29.81±0.77 | 38.61±0.91 | 7.54±0.32 | 27.22±1.86 | 40.70±0.42 |
| TCL W/ FINETUNING | 8.65±0.76 | 30.55±1.36 | 40.06±1.14 | 8.56±0.31 | 28.84±1.22 | 41.68±0.56 |
| TCL W/ PRETRAINING & FINETUNING | 9.91±1.84 | 30.97±0.07 | 41.55±0.47 | 9.19±0.43 | 29.85±1.76 | 41.33±1.07 |

PERFORMANCE COMPARISON ON FIRST SET OF VIDEOS
*TABLE 1*

| APPROACH | SECOND SET OF VIDEOS | | | THIRD SET OF VIDEOS | |
|---|---|---|---|---|---|
| | 1% | 5% | 10% | 1% | 5% |
| SUPERVISED (8F) | 52.55±4.36 | 85.22±0.61 | 90.45±0.33 | 6.17±0.32 | 20.50±0.23 |
| PSEUDO-LABEL | 57.99±3.70 | 87.47±0.64 | 90.96±0.48 | 6.32±0.19 | 20.81±0.86 |
| MEAN TEACHER | 56.68±1.46 | 88.80±0.44 | 92.07±0.03 | 6.80±0.42 | 22.98±0.43 |
| S4L | 64.98±2.70 | 87.23±0.15 | 90.81±0.32 | 6.32±0.38 | 23.33±0.89 |
| MIXMATCH | 58.46±3.26 | 89.09±0.21 | 92.06±0.46 | 6.97±0.48 | 21.89±0.22 |
| FIXMATCH | 61.50±0.77 | 90.20±0.35 | 92.62±0.60 | 6.38±0.38 | 25.65±0.28 |
| TCL | 75.21±4.48 | 93.29±0.24 | 94.64±0.21 | 7.69±0.21 | 30.28±0.13 |
| TCL W/ FINETUNING | 77.25±4.02 | 93.53±0.15 | 94.74±0.25 | 8.45±0.25 | 31.50±0.23 |
| TCL W/ PRETRAINING & FINETUNING | 82.55±1.94 | 93.73±0.25 | 94.93±0.02 | 11.56±0.22 | 31.91±0.46 |

PERFORMANCE COMPARISON ON SECOND AND THIRD SETS OF VIDEOS USING FIRST CONVENTIONAL BACKBONE
*TABLE 2*

| APPROACH | 10% | | |
|---|---|---|---|
| SUPERVISED (8F) | 17.53±0.49 | | |
| | $\rho = 1$ | $\rho = 0.5$ | $\rho = 0$ |
| PSEUDO-LABEL | 18.00±0.16 | 17.87±0.14 | 17.79±0.33 |
| FIXMATCH | 18.02±0.31 | 18.00±0.29 | 17.96±0.25 |
| TCL | 19.13±0.37 | 18.95±0.17 | 18.50±0.95 |
| TCL W/ FINETUNING | 19.68±0.37 | 19.58±0.31 | 19.56±0.82 |

*TABLE 3*

| Approach | TOP-1 ACCURACY |
|---|---|
| TCL W/O GROUP-CONTRASTIVE LOSS | 27.24±0.42 |
| TCL W/ PSEUDO-LABEL CONSISTENCY LOSS | 23.60±1.04 |
| TCL | 29.81±0.77 |

*TABLE 4*

*FIG. 5*

TEMPORAL CONTRASTIVE LEARNING FOR SEMI-SUPERVISED VIDEO ACTION RECOGNITION

The following disclosure(s) are submitted under 35 U.S.C. 102(b)(1)(A):

Ankit Singh, Omprakash Chakraborty, Ashutosh Varshney, Rameswar Panda, Rogerio Feris, Kate Saenko, and Abir Das. Semi-Supervised Action Recognition with Temporal Contrastive Learning. In Proceedings of the IEEE/CVF Conference on Computer Vision and Pattern Recognition 2021 (pp. 10389-10399), arXiv:2102.02751v1, 4 Feb. 2021.

Ankit Singh, Omprakash Chakraborty, Ashutosh Varshney, Rameswar Panda, Rogerio Feris, Kate Saenko, and Abir Das. Semi-Supervised Action Recognition with Temporal Contrastive Learning. In Proceedings of the IEEE/CVF Conference on Computer Vision and Pattern Recognition 2021 (pp. 10389-10399), arXiv:2102.02751v2, 29 Mar. 2021.

BACKGROUND

The present invention relates to the electrical, electronic and computer arts, and more specifically, to video processing systems.

Video is conventionally analyzed to identify actions and objects within the video, and to categorize the video for information retrieval and other tasks. Most video action analysis systems utilize supervised learning, that is, systems that learn from labeled data. Video data sets, however, often include many unlabeled videos which are typically expensive to label. Learning to recognize actions from only a handful of labeled videos is a challenging problem due to the scarcity of tediously collected activity labels.

SUMMARY

Principles of the invention provide techniques for semi-supervised video action recognition. In one aspect, an exemplary method includes the operations of training a base pathway of a computerized two-pathway video action recognition model using a plurality of labeled video samples; training the base pathway of the computerized two-pathway video action recognition model using a plurality of unlabeled video samples at a first framerate; training an auxiliary pathway of the computerized two-pathway video action recognition model using a plurality of the unlabeled video samples at a second framerate, the second framerate being slower than the first framerate (wherein said training of said base pathway using said plurality of labeled video samples, said training of said base pathway using said plurality of unlabeled video samples at said first framerate, and said training of said auxiliary pathway using said plurality of unlabeled video samples at said second framerate, result in a trained computerized two-pathway video action recognition model); categorizing a candidate video using the trained computerized two-pathway video action recognition model; and storing the categorized candidate video in a computer-accessible video database system for information retrieval.

In one aspect, an apparatus comprises a memory and at least one processor, coupled to the memory, and operative to perform a method comprising training a base pathway of a computerized two-pathway video action recognition model using a plurality of labeled video samples; training the base pathway of the computerized two-pathway video action recognition model using a plurality of unlabeled video samples at a first framerate; training an auxiliary pathway of the computerized two-pathway video action recognition model using a plurality of the unlabeled video samples at a second framerate, the second framerate being slower than the first framerate (wherein said training of said base pathway using said plurality of labeled video samples, said training of said base pathway using said plurality of unlabeled video samples at said first framerate, and said training of said auxiliary pathway using said plurality of unlabeled video samples at said second framerate, result in a trained computerized two-pathway video action recognition model); categorizing a candidate video using the trained computerized two-pathway video action recognition model; and storing the categorized candidate video in a computer-accessible video database system for information retrieval.

In one aspect, a computer program product comprises a computer readable storage medium having program instructions embodied therewith, the program instructions executable by a computer to cause the computer to perform a method comprising training a base pathway of a computerized two-pathway video action recognition model using a plurality of labeled video samples; training the base pathway of the computerized two-pathway video action recognition model using a plurality of unlabeled video samples at a first framerate; training an auxiliary pathway of the computerized two-pathway video action recognition model using a plurality of the unlabeled video samples at a second framerate, the second framerate being slower than the first framerate (wherein said training of said base pathway using said plurality of labeled video samples, said training of said base pathway using said plurality of unlabeled video samples at said first framerate, and said training of said auxiliary pathway using said plurality of unlabeled video samples at said second framerate, result in a trained computerized two-pathway video action recognition model); categorizing a candidate video using the trained computerized two-pathway video action recognition model; and storing the categorized candidate video in a computer-accessible video database system for information retrieval.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

utilization of rich supervisory information, in terms of 'time', that is present in otherwise unsupervised pool of videos;

performance improvement over video extensions of sophisticated state-of-the-art, semi-supervised image recognition methods across multiple diverse benchmark datasets and network architecture;

a contrastive objective between groups of videos that explores the underlying class concept that traditional Normalized Temperature-scaled Cross Entropy Loss (NT-Xent) loss among individual video instances ignores;

special treatment of the time axis in unlabeled videos by processing the videos at two different speeds;

a two-pathway temporal contrastive semi-supervised action recognition framework;

a group-contrastive loss that couples discriminative motion representation with pace-invariance and that significantly improves semi-supervised action recognition performance;

increased accuracy compared to conventional video analysis techniques;

performing machine learning with limited size data sets; and improved technological processes such as categorizing videos, retrieving videos from large databases, video recommendation, and computer vision.

These and other features and advantages of the present invention will become apparent from the following detailed description of illustrative embodiments thereof, which is to be read in connection with the accompanying drawings.

BRIEF DESCRIPTION OF THE DRAWINGS

FIG. 5 illustrates the performance of different action recognition methods on a variety of datasets, in accordance with an example embodiment;

DETAILED DESCRIPTION

Figure 1:
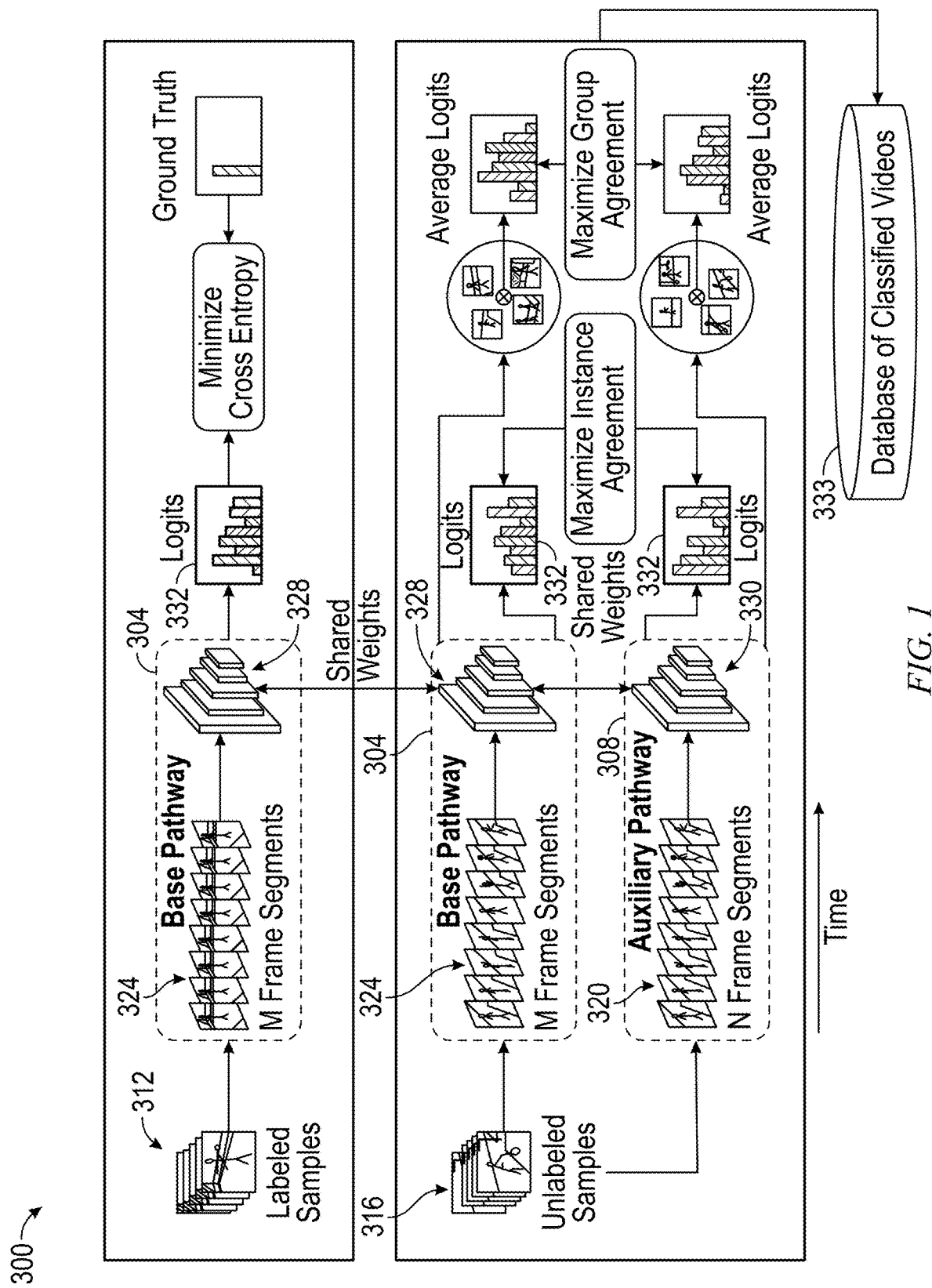
FIG. 1 is an illustration of an example Temporal Contrastive Learning (TCL) framework, in accordance with an example embodiment.

Generally, systems and methods for analyzing videos are disclosed. In one example embodiment, temporal contrastive learning is utilized and a two-pathway temporal contrastive model is learned using unlabeled videos at different speeds (such as two different speeds) to leverage the fact that changing a video's speed does not change an action. Specifically, the similarity between encoded representations of the same video at two different speeds are maximized and a similarity between different videos played at different speeds is minimized. In this way, the rich supervisory information, in terms of 'time,' that is present in an otherwise unsupervised pool of videos is utilized. With this effective strategy of utilizing different video playback rates, video extensions of sophisticated state-of-the-art semi-supervised image recognition methods are outperformed across multiple diverse benchmark datasets and network architectures. Interestingly, the disclosed approach benefits from out-of-domain unlabeled videos showing generalization and robustness. The disclosed approach has been verified by performing rigorous ablations and analysis to validate the approach.

Introduction

Supervised deep learning approaches have shown remarkable progress in video action recognition. Being supervised, however, these models are critically dependent on large datasets requiring tedious human annotation efforts. Supervised methods alone may not be enough to deal with the volume of information contained in videos. Semi-supervised learning approaches use structural invariance between different views of the same data as a source of supervision for learning useful representations. In recent times, semi-supervised representation learning models have performed well, even surpassing their supervised counterparts in the case of images.

Notwithstanding their potential, semi-supervised video action recognition has received very little attention. Trivially extending the image domain approaches to videos without considering the rich temporal information may not quite bridge the performance gap between semi- and fully-supervised learning; however, in videos, another source of supervision is available: time. It is widely known that an action recognizer is good if it can recognize actions irrespective of whether the actions are performed slowly or quickly.

In one example embodiment, Temporal Contrastive Learning (TCL) for semi-supervised action recognition is introduced for use in videos where consistent features representing both slow and fast versions of the same videos are learned. Starting with a model trained with a limited amount of labeled data, a two-pathway model is generated that processes unlabeled videos at two different speeds and finds their representations. Though played at two different speeds, the videos share the same semantics. Thus, similarity between these representations is maximized. Likewise, the similarity between the representations of different videos is minimized. This is achieved, in one or more embodiments, by minimizing a modified contrastive loss between the videos with different playback rates.

While minimizing a contrastive loss helps to produce better visual representations by learning to be invariant to different views of the data, it ignores information shared among samples of the same action class as the loss treats each video individually. To this end, a new perspective of contrastive loss between neighborhoods is utilized. Neighborhoods are compact groups of unlabeled videos with high class consistency. In the absence of ground-truth labels, groups are formed by clustering videos with the same pseudo-labels and are represented by averaging the representations of the constituent videos of the group. A contrastive objective between groups formed off the two paths explores the underlying class concept that traditional contrastive loss among individual video instances does not take into account. The contrastive loss is termed considering only individual instances as the instance-contrastive loss and the same between the groups as the group-contrastive loss, respectively.

Problem Setup

In one example embodiment, only a small set of videos ($D_l$) has labels, but a large number of unlabeled videos ($D_u$) are assumed to be present alongside. The set $D_l \triangleq \{V^i, y^i\}_{i=1}^{Ni}$ includes $N_i$ videos where the $i^{th}$ video and the corresponding activity label is denoted by $V^i$ and $y^i$, respectively. For a dataset of videos with C different activities, $y^i$ is often assumed to be an element of the label set $Y = \{1, 2, \ldots, C\}$. Similarly, the unlabeled set $D_u \triangleq \{U^i\}_{i=1}^{Nu}$ includes $N_u(>>N_l)$ videos without any associated labels. The unlabeled videos are used at two different frame rates (referred to as fast and slow videos herein). The fast version of the video $U^i$ is represented as a collection of M frames, i.e., $U_f^i = \{F_{f,1}^i, F_{f,2}^i, \ldots, F_{f,M}^i\}$. Likewise, the slow version of the same is represented as $U_s^i = \{F_{s,1}^i, F_{s,2}^i, \ldots, F_{s,N}^i\}$, where N<M. The frames can be sampled from the video, for example, following conventional techniques where a random frame is sampled uniformly from consecutive non-overlapping segments.

FIG. 1 is an illustration of an example Temporal Contrastive Learning (TCL) framework 300, in accordance with an example embodiment. The disclosed approach utilizes a base pathway 304 and an auxiliary pathway 308 that share the same weights. The base pathway 304 accepts video frames 324 sampled at a higher rate while the auxiliary pathway 308 takes in frames 320 at a lower framerate. In one example embodiment, at first, the base neural network 328 is trained using limited labeled data via the base pathway 304. Subsequently, both the base pathway 304 and the auxiliary pathway 308 are used for the unlabeled samples 316 by encouraging video representations to match in both pathways 304, 308 in absence of labels. This is done by maximizing agreement between the outputs of the two pathways 304, 308 for a video while minimizing the same for different videos. In addition, originally unlabeled videos 316 with high semantic similarity are grouped by pseudo-labels assigned to them. To exploit the high consistency and compactness of group members, the average representations of groups with the same pseudo-label in different pathways 304, 308 are made similar while those between the varying groups are made maximally different. Two separate contrastive losses (see, sections entitled Instance-Contrastive Loss and Group-Contrastive Loss below) are used for this purpose. Given a video at test time, only the base network is used to recognize the action. The classified videos can be stored in a suitable database 333 and searches can be performed based on the labels applied during inferencing (e.g., queries such as find videos of people walking, find videos of cars rolling down a highway, . . . ). Results can then be returned to the person making the query. The skilled artisan will be generally familiar with database technology, training neural networks, and inferencing with neural networks, and, given the teachings herein, will be able to adapt known neural network and database technologies to implement one or more embodiments. Database 333 can, for example, be local or cloud-implemented database software 68 running on a cloud-based server, for example.

Temporal Contrastive Learning

As shown in FIG. 1, the TCL framework 300 processes the input videos 312, 316 in two pathways, namely, the base pathway 304 and the auxiliary pathway 308. The fast version of the videos are processed by the base pathway 304 while the slow versions are processed by the auxiliary pathway 308. Both pathways 304, 308 share the same neural network backbone 328 (denoted by g(.)). In one example embodiment, different neural network backbones may be utilized for the pathways 304, 308. Different stages of training in the TCL framework 300 are described below.

Supervised Training Stage

The neural network backbone 328 is initially trained using only the small labeled data $D_l$ (labeled samples 312) by passing it through the base pathway 304. Depending on whether the neural network backbone 328 involves 2D or 3D convolution operations, the representation (g ($V^i$)) of the video $V^i$ used in the TCL framework 300 is an average of the frame logits or the logits 332 from the 3D neural network backbone 328 respectively. The supervised cross-entropy loss ($\mathcal{L}_{sup}$) is minimized on the labeled data as follows:

$$\mathcal{L}_{sup} = -\Sigma_{c=1}^{C}(y^i)_c \log(g(V^i)_c) \quad (1)$$

Instance-Contrastive Loss

Equipped with an initial neural network backbone 328 trained with limited supervision, a goal is to learn a model that can use a large pool of unlabeled video samples 316 for better activity understanding. To this end, temporal co-occurrence of unlabeled activities at multiple speeds is used as a proxy task; this is enforced with a pairwise contrastive loss. Specifically, the frame sampling rate is adjusted to generate videos 320, 324 with different speeds.

Consider a minibatch of B unlabeled video samples 316. The model is then trained to match the representation $g(U_f^i)$ of the comparatively faster version of the video ($U^i$) with $g(U_s^i)$ of the slower version; $g(U_f^i)$ and $g(U_s^i)$ form the positive pair. For the rest of the B—1 videos, $g(U_f^i)$ and $g(U_p^k)$ form negative pairs, where representation of the $k^{th}$ video can come from either of the pathways 304, 308 (i.e., $p \in \{f,s\}$). Inasmuch as different videos forming the negative pairs have different content, the representation(s) of different videos in either of the pathways 304, 308 are pushed apart. This is achieved by employing a contrastive loss $\mathcal{L}_{ic}$ as follows:

$$\mathcal{L}_{ic}((U_f^i, U_s^i)) = -\log \frac{h(g(U_f^i), g(U_s^i))}{h(g(U_f^i), g(U_s^i)) + \sum_{k=1}^{B} \mathbb{1}_{\{k \neq i\}} h(g(U_f^i), g(U_p^k))} \quad (2)$$

$$p \in \{s, f\}$$

where $$h(u, v) = \exp\left(\frac{u^T v}{\|u\|_2 \|v\|_2} / \tau\right)$$

is the exponential of the cosine similarity measure and $\tau$ is the temperature hyperparameter. The final instance-contrastive loss is computed for all positive pairs, i.e., both ($U_f^i, U_s^i$) and ($U_s^i, U_f^i$) across the minibatch. The loss function encourages decreasing the similarity not only between different videos in the two pathways 304, 308, but also between different videos across both of them.

Group-Contrastive Loss

Directly applying contrastive loss between different video instances in the absence of class-labels does not take the high level action semantics into account. Such a strategy can inadvertently learn different representations for videos containing the same actions. In one example embodiment, contrastive loss among groups of videos with similar actions is employed, where relations within the neighborhood of different videos are explored. Specifically, each unlabeled video $U^i$ in each of the two pathways 304, 308 is assigned pseudo-labels that correspond to the class having the maximum activation. Let $\hat{y}_f^i$ and $\hat{y}_s^i$ denote the pseudo-labels of the video $U^i$ in the fast and the slow pathways 304, 308, respectively. Videos having the same pseudo-label in a minibatch form a group in each pathway 304, 308 and the average of the representations of constituent videos provides the representation of the group as shown below:

$$R_p^l = \frac{\sum_{i=1}^{B} \mathbb{1}_{\{\hat{y}_p^i = l\}} g(U_p^i)}{T} \quad (3)$$

where $\|$ is an indicator function that evaluates to 1 for the videos with a pseudo-label equal to $l \in Y$ in each pathway $p \in \{f,s\}$ is the number of such videos in the minibatch.

Figure 2:
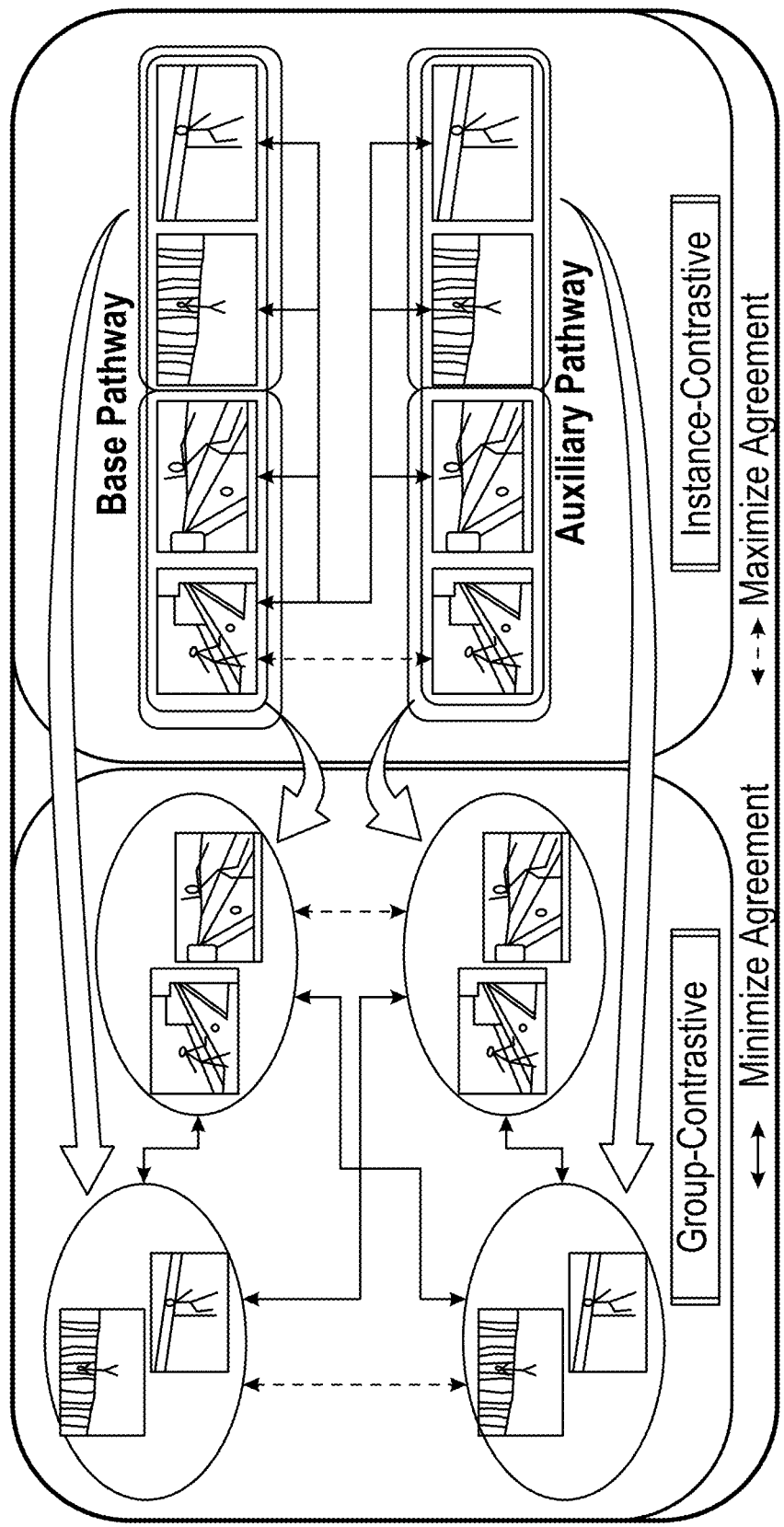
FIG. 2 illustrates an advantage of the use of group-contrastive loss over instance-contrastive loss, in accordance with an example embodiment.

FIG. 2 illustrates an advantage of the use of group-contrastive loss over instance-contrastive loss, in accordance with an example embodiment. (In FIG. 2, solid arrows represent minimal agreement and dashed arrows represent maximal agreement between the corresponding videos.) A contrastive objective between instances may try to push different instances of the same action apart (right), while forming groups of videos with the same activity class avoids such inadvertent competition (left). In the absence of true labels, such grouping is done by the predicted pseudo-labels.

Considering the high class consistency among two groups with the same label in two pathways 304, 308, in one or more embodiments these groups are required to give similar representations in the feature space. Thus, in the group-contrastive objective, all pairs ($R_f^l$, $R_s^l$) act as positive pairs while the negative pairs are the pairs ($R_f^l$, $R_p^m$) with $p \in \{f, s\}$ and $m \in Y \setminus l$ such that the constituent groups are different in either of the pathways 304, 308. The group-contrastive loss involving these pairs is, $$\mathcal{L}_{gc}(R_f^l, R_s^l) = -\log \frac{h(R_f^l, R_s^l)}{h(R_f^l, R_s^l) + \sum_{m=1}^{C} \mathbb{1}_{\{m \neq l\}} h(R_f^l, R_p^m)} \quad (4)$$
$$p \in \{s, f\}$$

Similar to instance-contrastive loss, group-contrastive loss is also computed for all positive pairs—both ($R_f^l$, $R_s^l$) and ($R_s^l$, $R_f^l$) across the minibatch. Overall, the loss function for training an exemplary model involving the limited labeled data and the unlabeled data is given by:

$$\mathcal{L} = L_{sup} + \gamma * L_{ic} + \beta * L_{gc} \quad (5)$$

where, $\gamma$ and $\beta$ are weights of the instance-contrastive and group-contrastive losses respectively. The weights may be determined empirically and may be set, for example, to one.

TCL with Pretraining and Finetuning

In one example embodiment, self-supervised pretraining is used to initialize the TCL model with very minimal change in the framework. Specifically, self-supervised pre-training is employed at the beginning by considering the whole of the labeled data (labeled samples 312) and the unlabeled data (unlabeled samples 316) $D_l \cup D_u$ as unlabeled data only and using instance-contrastive loss $\mathcal{L}_{ic}$ to encourage consistency between representations learned in the two pathways 304, 308 (ref. Eq. 2). These weights are then used to initialize the base pathway 304 and the auxiliary pathway 308 before the disclosed approach commences for semi-supervised learning of video representations. For effective utilization of the unlabeled data 316, the base pathway 204 is finetuned with pseudo-labels (the skilled artisan will be familiar with pseudo-labels, wherein a network is trained in a supervised fashion with labeled and unlabeled data simultaneously; for unlabeled data, pseudo-labels, just picking up the class which has the maximum predicted probability, are used as if they were true labels) generated at the end of the contrastive learning, which greatly enhances the discriminability of the features, leading to improvement in recognition performance. It can be empirically shown that starting with the same amount of labeling, both self-supervised pretraining and finetuning with pseudo-labels (Pretraining→TCL→Finetuning) benefits more compared to the same after limited supervised training only.

Experiments

Extensive experiments were conducted to show that the disclosed TCL framework 300 outperforms many strong baselines on several benchmarks including one with domain shift. Comprehensive ablation experiments were also performed to verify the effectiveness of different components in detail.

Experimental Setup

Datasets

The disclosed approach was evaluated using four datasets. The first set of videos contained 81 K training videos and 12 K testing videos across 87 action classes. The second set of videos contained 119 K videos for training and 15 K videos for validation across 27 annotated classes for hand gestures. The third set of videos contained is one of the most popular large-scale benchmarks for video action recognition. It consists of 240 K videos for training and 20 K videos for validation across 400 action categories, with each video lasting 6-10 seconds. The fourth set of videos contained contains 7,860 untrimmed egocentric videos of daily indoors activities recorded from both the third and first person views. The dataset contains 68,536 temporal annotations for 157 action classes. A subset of the third person videos from the fourth set of videos was used as the labeled data while the first person videos were considered as unlabeled data to show the effectiveness of the disclosed approach under domain shift in the unlabeled data.

Baselines

The disclosed approach is compared with the following baselines and existing semi-supervised approaches from the 2D image domain, extended to video data. A supervised baseline was considered where an action classifier having the same architecture as the base pathway 304 of the disclosed approach was trained. This is trained using a small portion of the labeled samples 312 assuming only a small subset of labeled samples 312 is available as annotated data. Second, the disclosed approach was compared with state-of-the-art semi-supervised learning approaches, including Pseudo-Label, Mean Teacher, S4L, Mix-Match, and Fix-Match. The same neural network backbone 328 and experimental settings were used for all the baselines (including the disclosed approach) for a fair comparison.

Implementation Details

Temporal Shift Module (TSM) was used with a first conventional backbone as the base action classifier in all of the experiments. Performance of different methods was further investigated by using a second conventional backbone on the first set of videos. TSM has recently been shown to be very effective due to its hardware efficiency and lesser computational complexity. Uniformly sampled 8 and 4 frame segments from unlabeled video samples 316 were used as input to the base pathway 304 and the auxiliary pathway 308, respectively, to process unlabeled video samples 316 in the TCL framework 300. On the other hand, only 8 frame segments for labeled video samples 312 were used and the final performance was computed using 8 frame segments in the base pathway 304 for all the methods. Note that the disclosed approach is agnostic to the backbone architecture and particular values of frame rates. Following the standard practice in SSL, a certain percentage of labeled sample 312 was randomly chosen as a small labeled set and the labels for the remaining data were discarded to form a large unlabeled set. The disclosed approach was trained with different percentages of labeled samples 312 for each dataset (1%, 5% and 10%). The disclosed models were trained for 400 epochs where the model was first trained with supervised loss $\mathcal{L}_{sup}$ using only labeled samples 312 for 50 epochs. The disclosed model was then trained using the combined loss (ref. Eq. 5) for the next 300 epochs. Finally, for finetuning with pseudo-labels, the disclosed model was trained with both labeled and unlabeled videos having pseudo-label confidence more than 0.8 for 50 epochs.

During pretraining, the standard practice in self-supervised learning was followed and the disclosed model was trained using all the training videos without any labels for 200 epochs. SGD was used with a learning rate of 0.02 and a momentum value of 0.9 with cosine learning rate decay in all of the experiments. Given a minibatch of labeled samples $B_l$, $\mu \times B_l$ unlabeled samples are utilized for training. $\mu$ is set to 3 and $\tau$ is set to 0.5 in all the experiments. $\gamma$ and $\beta$ values were taken to be 9 and 1, respectively, unless otherwise mentioned. Random scaling and cropping were used as data augmentation during training (and random flipping for Kinetics-400 is further adopted); just 1 clip per video and a center 224λ224 crop for evaluation were used.

Experiments

Figure 3:
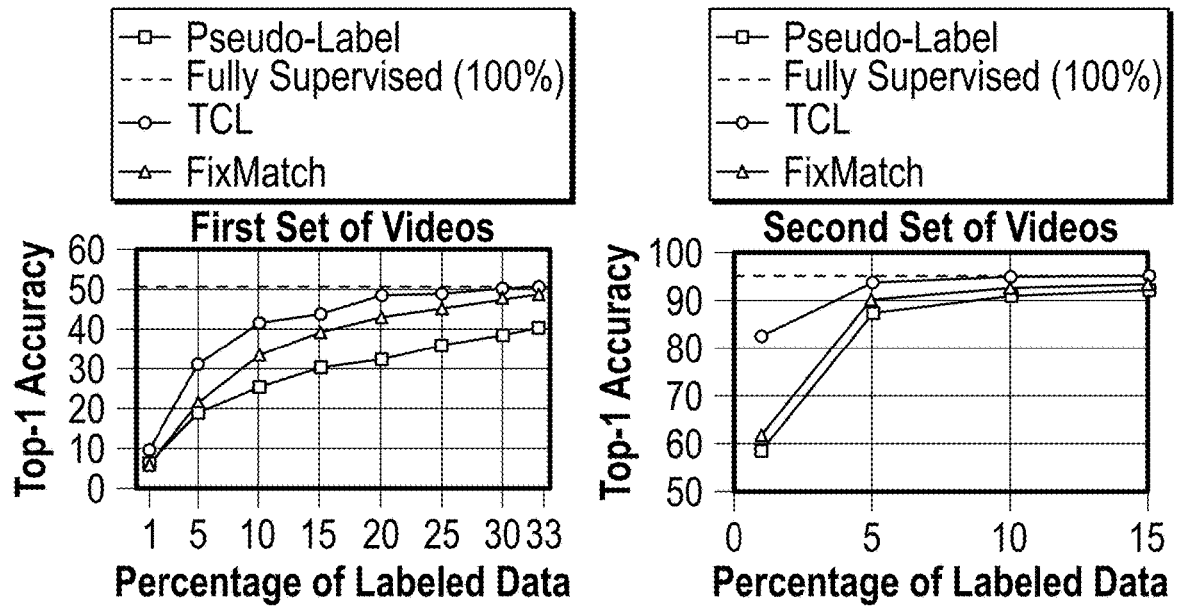
FIG. 3 shows a comparison of TCL with conventional techniques trained using different percentages of labeled training data, in accordance with an example embodiment.

Extensive experiments were performed on four standard datasets and demonstrate that TCL achieves superior performance over extended baselines of state-of-the-art image domain semi-supervised approaches. FIG. 3 shows a comparison of TCL with conventional techniques trained using different percentages of labeled training data, in accordance with an example embodiment. Using the same backbone network (the first conventional backbone), TCL needs only 33% and 15% of labeled data in the first set of videos and the second set of videos, respectively, to reach the performance of a conventional fully supervised approach that uses 100% labeled data. On the other hand, the two compared methods fail to reach the accuracy of the fully supervised approach with such a small amount of labeled data. Likewise, as good as 8.14% and 4.63% absolute improvement is observed in recognition performance over the next best approach using only 5% labeled data in the first set of videos and the third set of videos respectively. In a new realistic setting, it is maintained that unlabeled videos may come from a related but different domain than that of the labeled data. For instance, given a small set of labeled videos from a third person view, the disclosed approach is shown to benefit from using only first person unlabeled videos on the fourth set of videos, demonstrating the robustness to domain shift in the unlabeled set.

Large-Scale Experiments and Comparisons

Tables 1-3 of FIG. 5 illustrate the performance of different methods on four datasets, in terms of average top-1 clip accuracy and standard deviation over 3 random trials.

First Set of Videos

Table 1 shows the performance comparison of both the first conventional backbone (left half) and the second conventional backbone (right half) on the first set of videos. The numbers show average Top-1 accuracy values with standard deviations over three random trials for different percentages of labeled data. TCL outperforms the video extensions of all the semi-supervised image-domain baselines for all three percentages of labeled training data. The improvement is especially prominent for the low capacity model (the first conventional backbone) and low data (only 1% and 5% data with labels) regime. Notably, the disclosed approach outperforms the first conventional technique by 1.75% while training with only 1% labeled data. The improvement is 8.14% for the case when 5% data is labeled. These improvements clearly show that the disclosed approach is able to leverage the temporal information more effectively compared to the first conventional technique that focuses on only spatial image augmentations.

Figure 4:
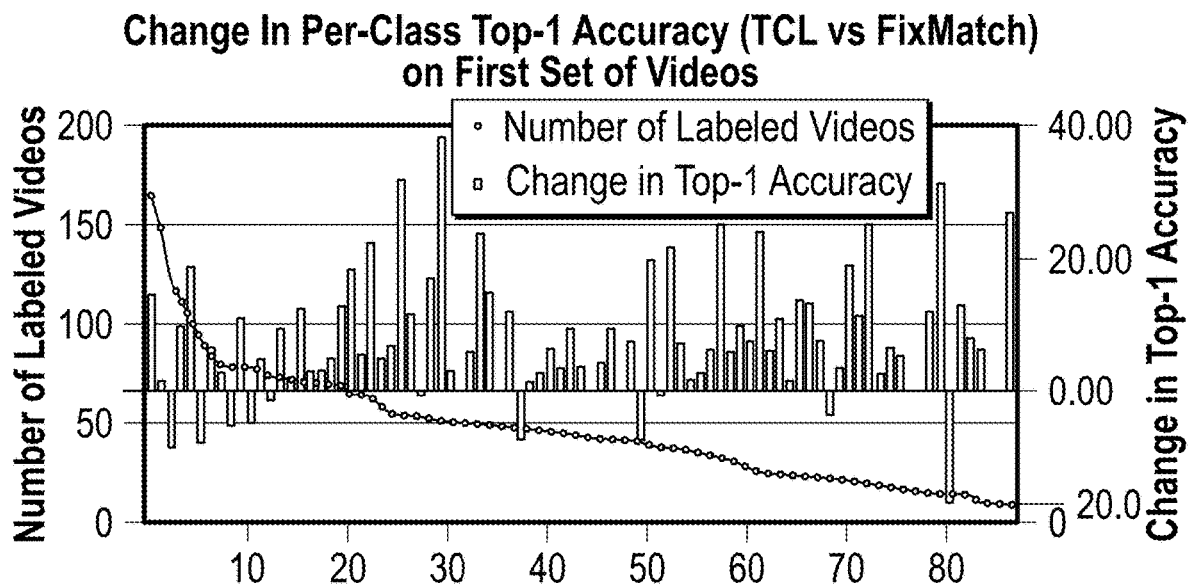
FIG. 4 illustrates the change in classwise top-1 accuracy of TCL over a first conventional technique on a first set of videos, in accordance with an example embodiment.

FIG. 4 illustrates the change in classwise top-1 accuracy of TCL over the first conventional technique on the first set of videos, in accordance with an example embodiment. The vertical bars show the change in accuracy on a 5% labeled scenario, while the line shows the number of labeled videos per class (sorted). Compared to the first conventional technique, TCL improves the performance of most classes including those with less labeled data. The plot shows that an overwhelming majority of the activities experienced improvement with a decrease in performance for only 1 class out of 18 having less than 20 labeled videos per class (right-side of the figure). For a low labeled data regime (1% and 5%), a heavier model shows signs of overfitting as is shown by a slight drop in performance. On the other hand, using the second conventional backbone instead of the first conventional backbone is shown to benefit TCL if the model is fed with more labeled data. Moreover, TCL with finetuning and pretraining shows further improvement, leading to best performance in both cases.

Second Set of Videos

Table 2 shows a performance comparison on the second set of videos and the third set of videos. The numbers show the top-1 accuracy values using the first conventional backbone on both datasets. The TCL approach also surpasses the performance of existing semi-supervised approaches in Jester as shown in Table 2 (left-side). In particular, TCL achieves 10.23% absolute improvement compared to S4L (the next best) in very low labeled-data regime (1% only). Adding finetuning and self-supervised pretraining further increases this difference to 17.57%. Furthermore, TCL with pretraining and finetuning achieves a top-1 accuracy of 94.93% using 10% labeled data which is only 0.32% lower than the fully supervised baseline trained using all the labels (95.25%).

Third Set of Videos

Table 2 (right-side) summarizes the results on the third set of videos, which is one of the widely used action recognition datasets consisting of 240 K videos across 400 classes. TCL outperforms the first conventional technique by a margin of 1.31% and 4.63% on 1% and 5% scenarios, respectively, showing the superiority of the disclosed approach on large scale datasets. The top-1 accuracy achieved using TCL with finetuning and pretraining is almost two times better than the supervised approach when only 1% of the labeled data is used. The results also show that off-the-shelf extensions of sophisticated state-of-the-art semi-supervised image classification methods offer little benefit to action classification on videos.

Fourth Set of Videos

Third person videos from the fourth set of videos were used as the target while the first person videos form the additional unlabeled set. During training, labeled data is taken only from the target domain while unlabeled data is obtained from both the target and the domain-shifted videos. To modulate domain shift in unlabeled data, a new hyperparameter ρ, is introduced whose value denotes the proportion of target videos in the unlabeled set. For a fixed number of unlabeled videos $|D_u|$, we randomly select $ρ×|D_u|$ videos from the target while the remaining $(1-ρ)×|D_u|$ are selected from the other domain. Following the standard practice in this dataset, the model was first pretrained using the fourth set of videos and three different values of ρ: 1, 0.5, 0 were used for 10% target data with labels. Table 3 shows the mean Average Precision (mAP) of the disclosed method including the supervised approach, and two conventional approaches. TCL outperforms both methods by around 1% mAP for all three p values. In the case when all the unlabeled data is from the shifted domain (ρ=0), the performance of the disclosed approach is even better than the performance of the next best approach with ρ=1, i.e., when all unlabeled data is from the target domain itself. This depicts the robustness of TCL and its ability to harness diverse domain data more efficiently in a semi-supervised setting.

Role of Pseudo-Labeling

The reliability of pseudo-labeling was tested on the second set of videos (using the first conventional backbone and 1% labeling) with 50 epoch intervals and it was observed that the pseudo-labeling accuracy gradually increases from 0% at the beginning to 65.95% at 100 epoch, and then to 93.23% at 350 epoch. This shows that, while the disclosed model may create some wrong groups at the start, it gradually improves the groups as the training proceeds, leading to a better representation by exploiting both instance and group contrastive losses.

Ablation Studies

Extensive ablation studies were performed on the first set of videos with 5% labeled data and the first conventional backbone to better understand the effect of different losses and hyperparameters in the TCL framework 300. Table 4 in FIG. 5 illustrates the results of the ablation studies on the first set of videos. The numbers show top-1 accuracy with the first conventional backbone and 5% labeled Data.

Effect of Group Contrastive Loss

An experiment was performed by removing group contrastive loss from the TCL framework 300 (see, section entitled Group-Contrastive Loss) and it was observed that top-1 accuracy drops to 27.24% from 29.81% (Table 4), showing the importance of group contrastive loss in capturing high-level semantics.

Ablation on Contrastive Loss

The effectiveness of the disclosed contrastive loss was investigated by replacing it with the pseudo-label consistency loss used in the first conventional technique. It was observed that training with the disclosed contrastive loss surpasses the performance of the training with the pseudo-label consistency loss by a high margin (around 6.21% gain in the top-1 accuracy) on the first set of videos (Table 4). The disclosed approach was further compared in the absence of group-consistency (TCL w/o Group-Contrastive Loss) with a variant of the first conventional technique that uses temporal augmentation and observed that the disclosed approach still outperforms it by a margin of 2.66% (24.58% vs 27.24%) on the first set of videos (with the first conventional backbone and 5% labeling). This shows that temporal augmentation alone fails to obtain superior performance and this improvement is in fact due to the efficacy of the disclosed contrastive loss formulation over the pseudo-label loss used in the first conventional technique.

Effect of Different Frame Rate

The effect of doubling frame-rates in both pathways 304, 308 was analyzed and it was observed that TCL (with 16 frame segments in the base pathway 304 and 8 frame segments in the auxiliary pathway 308) improved top-1 accuracy by 1.5% on the first set of videos with the first conventional backbone and 5% labeled data (29.81% vs 31.31%).

Effect of Hyperparameters

Figure 6:
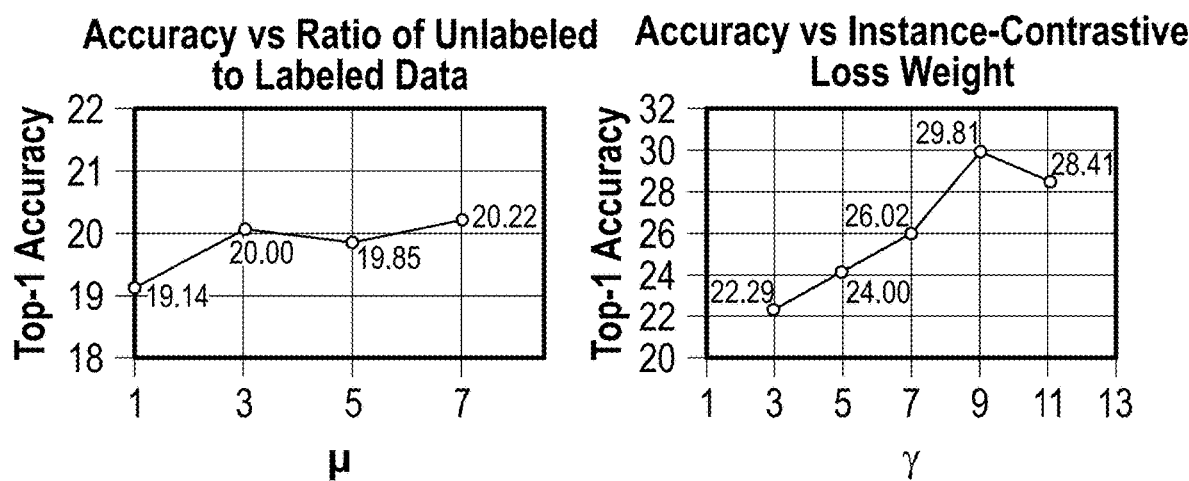
FIG. 6 illustrates the effect of hyperparameters on the first set of videos, in accordance with an example embodiment.

The effect of the ratio of unlabeled data to labeled data (μ) was analyzed. FIG. 6 illustrates the effect of hyperparameters on the first set of videos, in accordance with an example embodiment. Varying the ratio of unlabeled data to the labeled data (μ) (right-side) and varying the instance-contrastive loss weight (γ), it was observed that setting (μ) to {3, 5, 7} (with a fixed γ=1) produces similar results on the first set of videos (FIG. 6, left-side). However, as scaling μ often requires high computational resources, (μ) was set to 3 in all of the experiments to balance the efficiency and accuracy in semi-supervised action recognition. It was also found that weight of the instance-contrastive loss (γ) greatly affects the performance in semi-supervised learning as accuracy drops by more than 6% when setting γ to 3 instead of the optimal value of 9 on the first set of videos with the first conventional backbone and 5% of labeling (FIG. 6, right-side).

Comparison with Self-Supervised Approaches

The disclosed methods were compared with three video self-supervised methods, namely Odd-One-Out Networks (O3N), Video Clip Order Prediction (COP), and Memory-augmented Dense Predictive Coding (MemDPC) through pretraining using a self-supervised method and then fine-tuning using available labels on the first set of videos (with the first conventional backbone and 5% labeled data). The disclosed approach significantly outperforms all the compared methods by a margin of 6%-10%, showing its effectiveness over self-supervised methods. Moreover, the disclosed temporal contrastive learning was replaced with a conventional method and it was observed that accuracy drops to 24.58% from 29.81%, showing the efficacy of the disclosed contrastive learning formulation over the alternate video-based self-supervised method on the first set of videos.

It will accordingly be appreciated that one or more embodiments provide a novel temporal contrastive learning frame-work for semi-supervised action recognition by maximizing the similarity between encoded representations of the same unlabeled video at two different speeds as well as minimizing the similarity between different unlabeled videos run at different speeds. In one or more embodiments, a contrastive loss is employed between different video instances (including groups of videos) with similar actions to explore high-level action semantics within the neighborhood of different videos depicting different instances of the same action. The effectiveness of one or more embodiments was demonstrated on four standard benchmark datasets, significantly outperforming several competing methods.

Given the discussion thus far, it will be appreciated that, in general terms, an exemplary method, according to an aspect of the invention, includes the operations of training a base pathway 304 of a computerized two-pathway video action recognition model 300 using a plurality of labeled video samples 312; training the base pathway 304 of the computerized two-pathway video action recognition model 300 using a plurality of unlabeled video samples 316 at a first framerate; training an auxiliary pathway 308 of the computerized two-pathway video action recognition model 300 using a plurality of the unlabeled video samples 316 at a second framerate, the second framerate being slower than the first framerate; wherein said training of said base pathway 304 using said plurality of labeled video samples 312, said training of said base pathway 304 using said plurality of unlabeled video samples 316 at said first framerate, and said training of said auxiliary pathway 308 using said plurality of unlabeled video samples 316 at said second framerate, result in a trained computerized two-pathway video action recognition model 300; categorizing a candidate video using the trained computerized two-pathway video action recognition model 300; and storing the categorized candidate video in a computer-accessible video database system 333 for information retrieval.

In one example embodiment, the two-pathway video action recognition model 300 comprises a temporal contrastive model.

In one example embodiment, a contrastive objective is based on a maximization of a similarity between encoded representations of a same video of the unlabeled video samples 316 at different framerates and a minimization of a similarity between encoded representations of different videos of the unlabeled video samples 316 at different speeds.

In one example embodiment, the similarity between the different videos of the unlabeled video samples 316 is minimized by minimizing a modified Normalized Temperature-scaled Cross Entropy Loss (NT-Xent) contrastive loss between the different videos.

In one example embodiment, the base pathway 304 and the auxiliary pathway 308 share a same set of weights.

In one example embodiment, groups of the unlabeled video samples 316 having a same pseudo-label in a minibatch are formed, and each group is represented with an average representation of the unlabeled video samples 316 within each group, wherein the contrastive objective is based on a group-contrastive loss between the groups of the unlabeled video samples 316 that couples discriminative motion representation with pace-invariance.

In one example embodiment, the average representation is based on:

$$R_p^l = \frac{\sum_{i=1}^{B} \mathbb{1}_{\{\hat{y}_p^i = l\}} g(U_p^i)}{T}$$

where $\|$ is an indicator function that evaluates to 1 for videos with a pseudo-label equal to $l \in Y$ in each pathway $p \in \{f, s\}$, $g(U_p^i)$ is a representation of a corresponding video, B is a count of videos in the minibatch, $\hat{y}_p^i$ denotes pseudo-labels of the video $U^i$, and T is a number of the videos with the pseudo-label equal to $l \in Y$ in the minibatch.

In one example embodiment, the training operations are performed on a neural network backbone 328 involving at least one of two-dimensional (2D) and three-dimensional (3D) convolution operations.

In one example embodiment, a standard supervised cross-entropy loss ($\mathcal{L}_{sup}$) is minimized on the labeled video samples 312, the standard supervised cross-entropy loss ($\mathcal{L}_{sup}$) being given by:

$$\mathcal{L}_{sup} = -\sum_{c=1}^{C} (y^i)_c \log(g(V^i))_c$$

where $g(V^i)$ is a representation of a corresponding video $V^i$ and C is a count of different activities.

In one example embodiment, the two-pathway video action recognition model 300 is trained to match a representation $g(U_f^i)$ of a faster framerate version of a video ($U^i$) with a representation $g(U_s^i)$ of a comparatively slower framerate version of the video ($U^i$).

In one example embodiment, the two-pathway video action recognition model 300 is trained using a loss function $\mathcal{L}$ given by:

$$\mathcal{L} = \mathcal{L}_{sup} + \gamma * \mathcal{L}_{ic} + \beta * \mathcal{L}_{gc}$$

where $\mathcal{L}_{sup}$ is a standard supervised cross-entropy loss, $\mathcal{L}_{ic}$ is an instance-contrastive loss, $\mathcal{L}_{gc}$ is a group-contrastive loss, and $\gamma$ and $\beta$ are weights of the instance-contrastive and group-contrastive losses, respectively.

In one example embodiment, the instance-contrastive loss $\mathcal{L}_{ic}$ is:

$$\mathcal{L}_{ic}(U_f^i, U_s^i) = -\log \frac{h(g(U_f^i), g(U_s^i))}{h(g(U_f^i), g(U_s^i)) + \sum_{k=1}^{B} \mathbb{1}_{\{k \neq i\}} h(g(U_f^i), g(U_p^k))} \quad (2)$$

$$p \in \{s, f\}$$

where $$h(u, v) = \exp\left(\frac{u^T v}{\|u\|_2 \|v\|_2} / \tau\right)$$

is an exponential of cosine similarity measure, B is a count of videos in a minibatch, $\tau$ is a temperature hyperparameter, $g(U_s^i)$ is a representation of a comparatively slower framerate version of a video ($U^i$), $g(U_f^i)$ is a representation of a comparatively faster framerate version of the video ($U^i$), and ($U_f^i$, $U_s^i$) and ($U_s^i$, $U_f^i$) are positive pairs of the unlabeled video samples 316 across the minibatch.

In one example embodiment, the group-contrastive loss is:

$$\mathcal{L}_{gc}(R_f^l, R_s^l) = -\log \frac{h(R_f^l, R_s^l)}{h(R_f^l, R_s^l) + \sum_{m=1}^{C} \mathbb{1}_{\{m \neq l\}} h(R_f^l, R_p^m)}$$

$$p \in \{s, f\}$$

where $\|$ is an indicator function that evaluates to 1 for videos with a pseudo-label equal to $l \in Y$ in each pathway $p \in \{f, s\}$, C is a count of different activities, $R_f^l$ is an average representation of a comparatively faster framerate version of a video ($U^i$), $R_s^l$ is an average representation of a comparatively slower framerate version of the video ($U^i$).

In one example embodiment, a searched video in the computer-accessible video database system 333 for information retrieval is identified based on a given action.

In one aspect, an apparatus comprises a memory and at least one processor, coupled to the memory, and operative to perform a method comprising training a base pathway 304 of a computerized two-pathway video action recognition model 300 using a plurality of labeled video samples 312; training the base pathway 304 of the computerized two-pathway video action recognition model 300 using a plurality of unlabeled video samples 316 at a first framerate; training an auxiliary pathway 308 of the computerized two-pathway video action recognition model 300 using a plurality of the unlabeled video samples 316 at a second framerate, the second framerate being slower than the first framerate (wherein said training of said base pathway 304 using said plurality of labeled video samples 312, said training of said base pathway 304 using said plurality of unlabeled video samples 316 at said first framerate, and said training of said auxiliary pathway 308 using said plurality of unlabeled video samples 316 at said second framerate, result in a trained computerized two-pathway video action recognition model 300); categorizing a candidate video using the trained computerized two-pathway video action recognition model 300; and storing the categorized candidate video in a computer-accessible video database system 333 for information retrieval.

In one aspect, a computer program product comprises a computer readable storage medium having program instructions embodied therewith, the program instructions executable by a computer to cause the computer to perform a method comprising training a base pathway 304 of a computerized two-pathway video action recognition model 300 using a plurality of labeled video samples 312; training the base pathway 304 of the computerized two-pathway video action recognition model 300 using a plurality of unlabeled video samples 316 at a first framerate; training an auxiliary pathway 308 of the computerized two-pathway video action recognition model 300 using a plurality of the unlabeled video samples 316 at a second framerate, the second framerate being slower than the first framerate (wherein said training of said base pathway 304 using said plurality of labeled video samples 312, said training of said base pathway 304 using said plurality of unlabeled video samples 316 at said first framerate, and said training of said auxiliary pathway 308 using said plurality of unlabeled video samples 316 at said second framerate, result in a trained computerized two-pathway video action recognition model 300); categorizing a candidate video using the trained computerized two-pathway video action recognition model 300; and storing the categorized candidate video in a computer-accessible video database system 333 for information retrieval.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
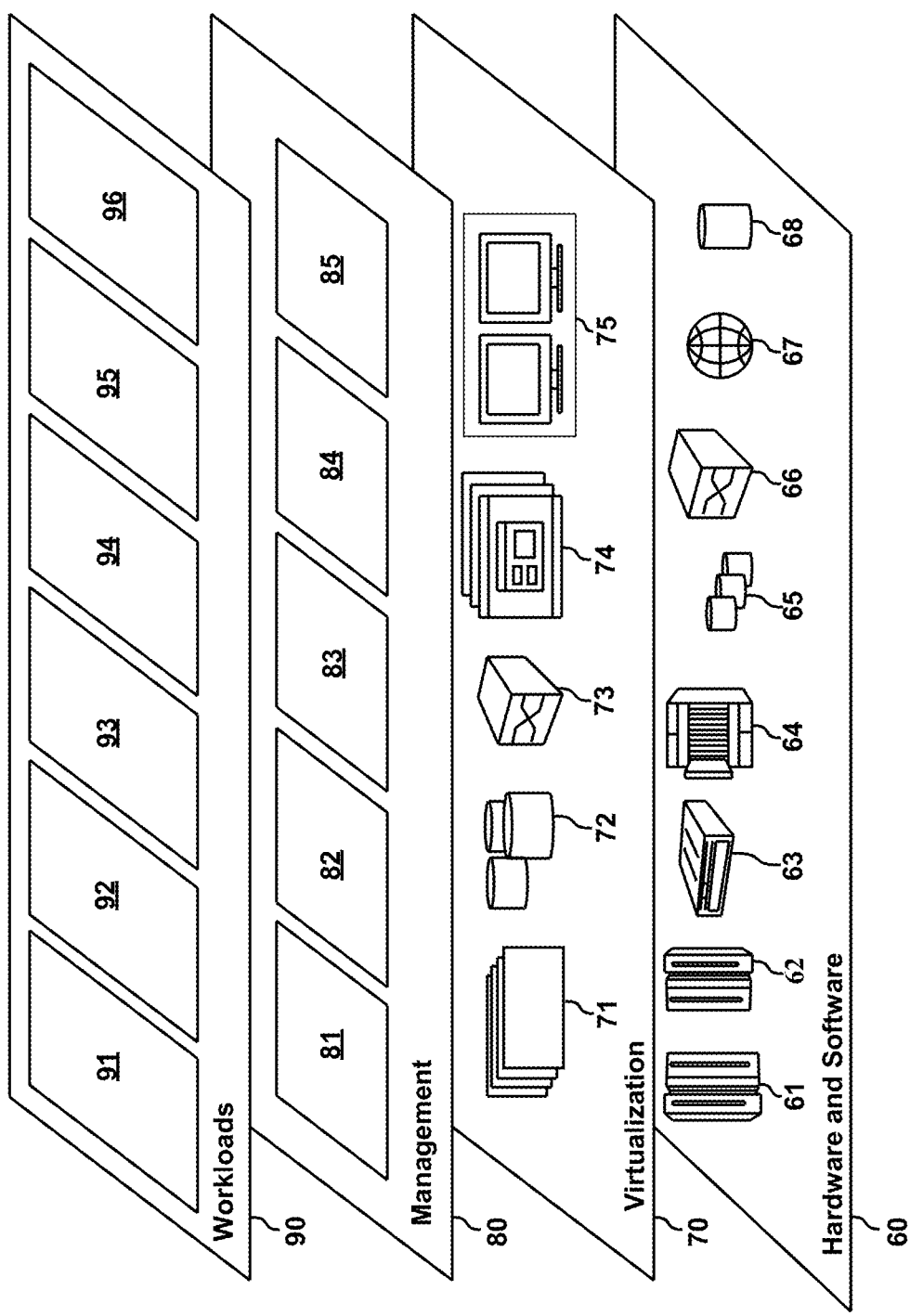
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
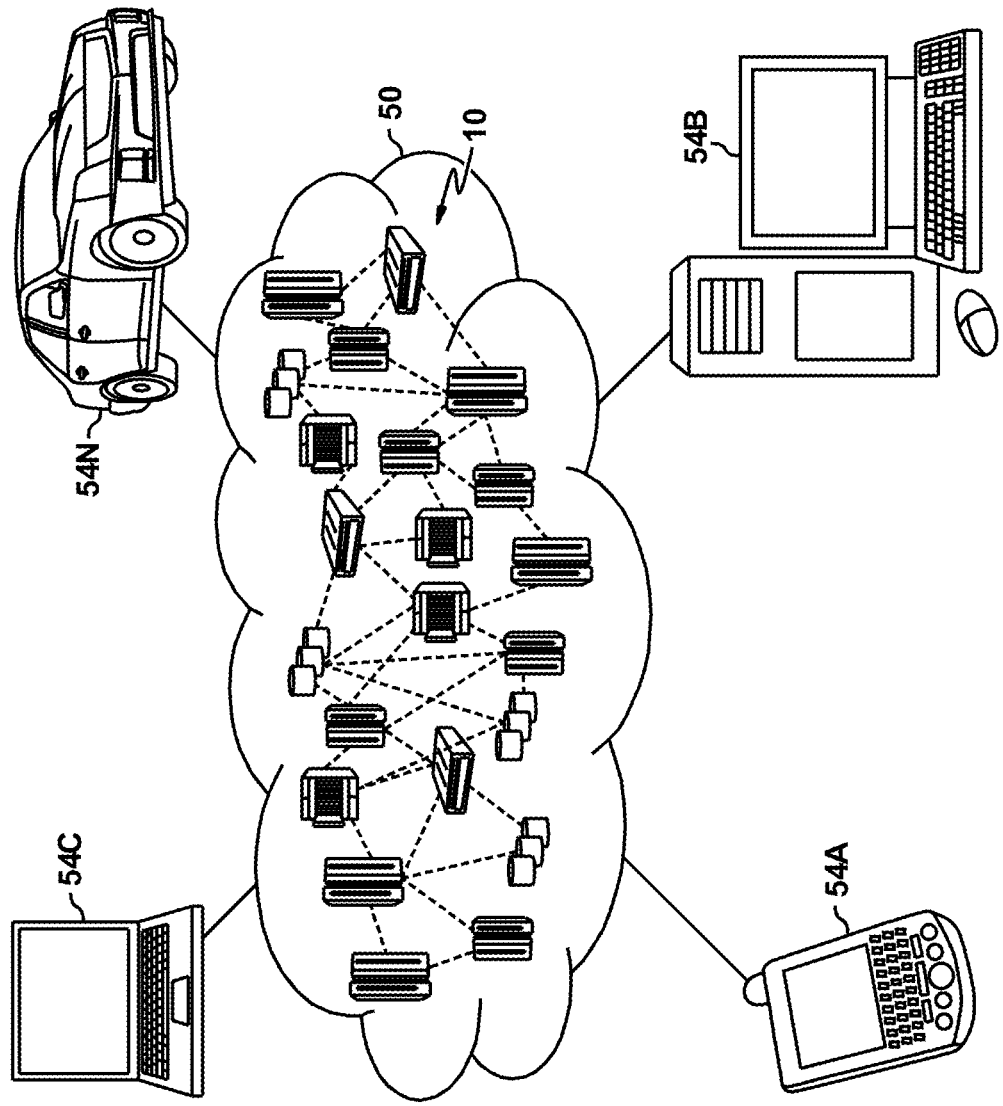
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a video processing component 96 that implements aspects of semi-supervised video action recognition and learning.

Figure 9:
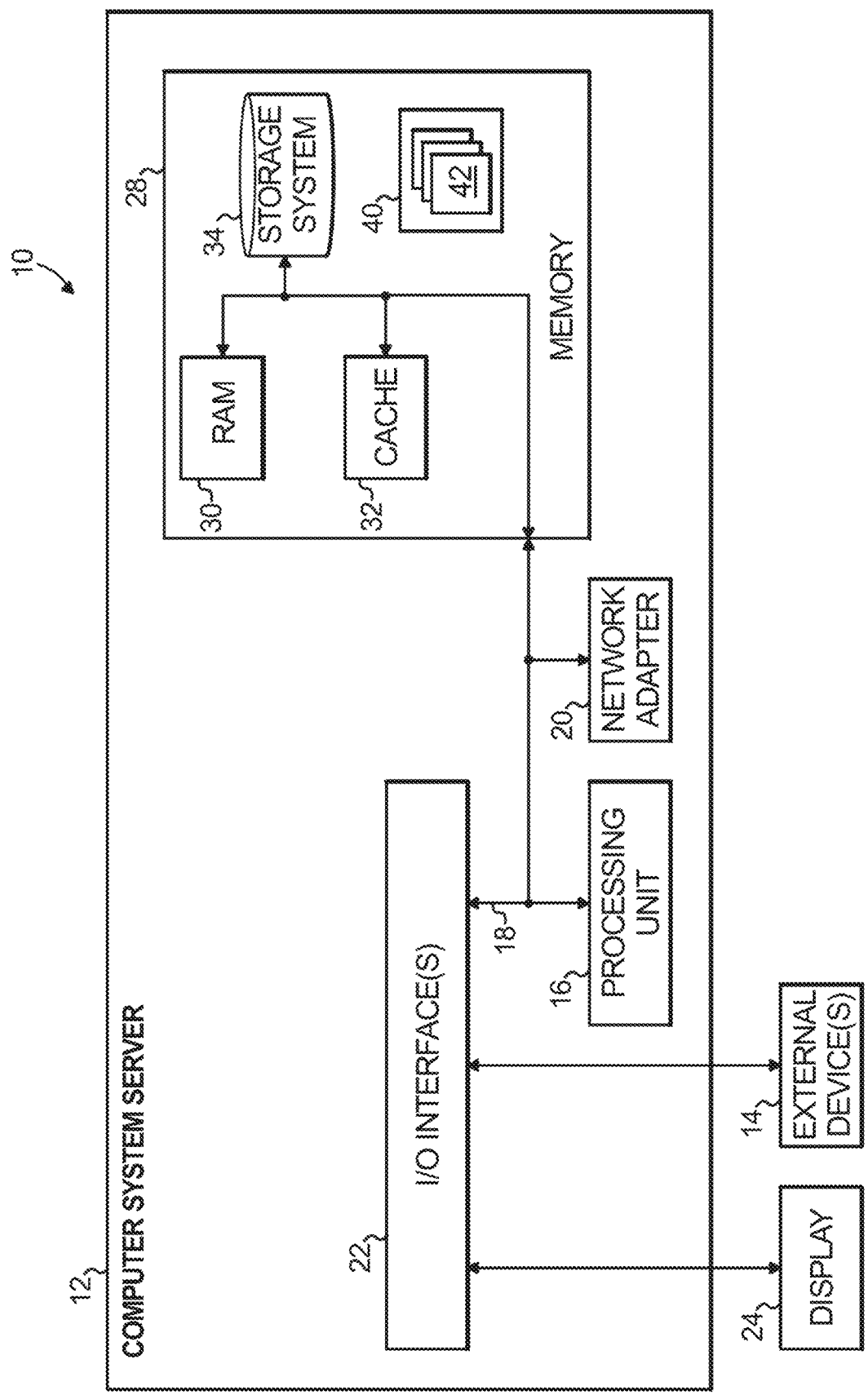
FIG. 9 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 9 depicts a computer system that may be useful in implementing one or more aspects and/or elements of the invention, also representative of a cloud computing node according to an embodiment of the present invention. Referring now to FIG. 9, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 9, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 9) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 7-8 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   training a base pathway of a computerized two-pathway video action recognition model using a plurality of labeled video samples;
   training the base pathway of the computerized two-pathway video action recognition model using a plurality of unlabeled video samples at a first framerate;
   training an auxiliary pathway of the computerized two-pathway video action recognition model using a plurality of the unlabeled video samples at a second framerate, the second framerate being slower than the first framerate;
   wherein said training of said base pathway using said plurality of labeled video samples, said training of said base pathway using said plurality of unlabeled video samples at said first framerate, and said training of said auxiliary pathway using said plurality of unlabeled video samples at said second framerate, result in a trained computerized two-pathway video action recognition model;
   categorizing a candidate video using the trained computerized two-pathway video action recognition model; and
   storing the categorized candidate video in a computer-accessible video database system for information retrieval.

2. The method of claim 1, wherein the two-pathway video action recognition model comprises a temporal contrastive model.

3. The method of claim 1, wherein a contrastive objective is based on a maximization of a similarity between encoded representations of a same video of the unlabeled video samples at different framerates and a minimization of a similarity between encoded representations of different videos of the unlabeled video samples at different speeds.

4. The method of claim 3, wherein the similarity between the different videos of the unlabeled video samples is minimized by minimizing a modified Normalized Temperature-scaled Cross Entropy Loss (NT-Xent) contrastive loss between the different videos.

5. The method of claim 3, further comprising forming groups of the unlabeled video samples having a same pseudo-label in a minibatch, and representing each group with an average representation of the unlabeled video samples within each group, wherein the contrastive objective is based on a group-contrastive loss between the groups of the unlabeled video samples that couples discriminative motion representation with pace-invariance.

6. The method of claim 1, wherein the base pathway and the auxiliary pathway share a same set of weights.

7. The method of claim 6, wherein the average representation is based on:

$$R_p^l = \frac{\sum_{i=1}^{B} \mathbb{1}_{\{\hat{y}_p^i = l\}} g(U_p^i)}{T}$$

where $\mathbb{1}$ is an indicator function that evaluates to 1 for videos with a pseudo-label equal to $l \in Y$ in each pathway $p \in \{f, s\}$, $g(U_p^i)$ is a representation of a corresponding video, B is a count of videos in the minibatch, $\hat{y}_p^i$ denotes pseudo-labels of the video $U^i$, and T is a number of the videos with the pseudo-label equal to $l \in Y$ in the minibatch.

8. The method of claim 1, wherein the training operations are performed on a neural network backbone involving at least one of two-dimensional (2D) and three-dimensional (3D) convolution operations.

9. The method of claim 1, further comprising minimizing a standard supervised cross-entropy loss ($\mathcal{L}_{sup}$) on the labeled video samples, the standard supervised cross-entropy loss ($\mathcal{L}_{sup}$) being given by:

$$\mathcal{L}_{sup} = -\sum_{c=1}^{C} (y^i)_c \log(g(V^i))_c$$

where $g(V^i)$ is a representation of a corresponding video $V^i$ and C is a count of different activities.

10. The method of claim 1, wherein the two-pathway video action recognition model is trained to match a representation $g(U_f^i)$ of a faster framerate version of a video ($U^i$) with a representation $g(U_s^i)$ of a comparatively slower framerate version of the video ($U^i$).

11. The method of claim 1, wherein training the two-pathway video action recognition model is carried out using a loss function $\mathcal{L}$ given by:

$$\mathcal{L} = \mathcal{L}_{sup} + \gamma * \mathcal{L}_{ic} + \beta * \mathcal{L}_{gc}$$

where $\mathcal{L}_{sup}$ is a standard supervised cross-entropy loss, $\mathcal{L}_{ic}$ is an instance-contrastive loss, $\mathcal{L}_{gc}$ is a group-contrastive loss, and $\gamma$ and $\beta$ are weights of the instance-contrastive and group-contrastive losses, respectively.

12. The method of claim 11, wherein the instance-contrastive loss $\mathcal{L}_{ic}$ is:

$$\mathcal{L}_{ic}(U_f^i, U_s^i) = -\log \frac{h(g(U_f^i), g(U_s^i))}{h(g(U_f^i), g(U_s^i)) + \sum_{k=1}^{B} \mathbb{1}_{(k \neq i)} h(g(U_f^i), g(U_p^k))} \quad (2)$$

$$p \in \{s, f\}$$

where $$h(u, v) = \exp\left(\frac{u^T v}{\|u\|_2 \|v\|_2}/\tau\right)$$

is an exponential of cosine similarity measure, B is a count of videos in a minibatch, τ is a temperature hyperparameter, $g(U_s^i)$ is a representation of a comparatively slower framerate version of a video ($U^i$), $g(U_f^i)$ is a representation of a comparatively faster framerate version of the video ($U^i$), and ($U_f^i$, $U_s^i$) and ($U_s^i$, $U_f^i$) are positive pairs of the unlabeled video samples across the minibatch.

13. The method of claim 11, wherein the group-contrastive loss is:

$$\mathcal{L}_{gc}(R_f^l, R_s^l) = -\log \frac{h(R_f^l, R_s^l)}{h(R_f^l, R_s^l) + \sum_{m=1}^{C} \mathbb{1}_{\{m \neq l\}} h(R_f^l, R_p^m)}$$
$$p \in \{s, f\}$$

where ∥ is an indicator function that evaluates to 1 for videos with a pseudo-label equal to l∈ Y in each pathway p∈ {f, s}, C is a count of different activities, $R_f^l$ is an average representation of a comparatively faster framerate version of a video ($U^i$), $R_s^l$ is an average representation of a comparatively slower framerate version of the video ($U^i$).

14. The method of claim 1, further comprising identifying a searched video in the computer-accessible video database system for information retrieval based on a given action.

15. The method of claim 1, wherein the categorizing of the candidate video further comprises using structural invariance between the first framerate and the second framerate of a same unlabeled video sample as a source of supervision for learning representations by maximizing a similarity between encoded representations of a same video of the unlabeled video samples played at the first framerate and the second framerate and minimizing a similarity between a pair of the unlabeled video samples played at the first framerate and the second framerate.

16. An apparatus comprising:
a memory; and
at least one processor, coupled to said memory, and operative to perform a method comprising:
training a base pathway of a computerized two-pathway video action recognition model using a plurality of labeled video samples;
training the base pathway of the computerized two-pathway video action recognition model using a plurality of unlabeled video samples at a first framerate;
training an auxiliary pathway of the computerized two-pathway video action recognition model using a plurality of the unlabeled video samples at a second framerate, the second framerate being slower than the first framerate;
wherein said training of said base pathway using said plurality of labeled video samples, said training of said base pathway using said plurality of unlabeled video samples at said first framerate, and said training of said auxiliary pathway using said plurality of unlabeled video samples at said second framerate, result in a trained computerized two-pathway video action recognition model;
categorizing a candidate video using the trained computerized two-pathway video action recognition model; and
storing the categorized candidate video in a computer-accessible video database system for information retrieval.

17. The apparatus of claim 16, wherein the two-pathway video action recognition model comprises a temporal contrastive model.

18. The apparatus of claim 16, wherein a contrastive objective is based on a maximization of a similarity between encoded representations of a same video of the unlabeled video samples at different framerates and a minimization of a similarity between encoded representations of different videos of the unlabeled video samples at different speeds, the method further comprising forming groups of the unlabeled video samples having a same pseudo-label in a minibatch, and representing each group with an average representation of the unlabeled video samples within each group, wherein the contrastive objective is based on a group-contrastive loss between the groups of the unlabeled video samples that couples discriminative motion representation with pace-invariance.

19. The apparatus of claim 16, wherein the base pathway and the auxiliary pathway share a same set of weights.

20. A computer program product, the computer program product comprising a computer readable storage medium having program instructions embodied therewith, the program instructions executable by a computer to cause the computer to perform a method comprising:
training a base pathway of a computerized two-pathway video action recognition model using a plurality of labeled video samples;
training the base pathway of the computerized two-pathway video action recognition model using a plurality of unlabeled video samples at a first framerate;
training an auxiliary pathway of the computerized two-pathway video action recognition model using a plurality of the unlabeled video samples at a second framerate, the second framerate being slower than the first framerate;
wherein said training of said base pathway using said plurality of labeled video samples, said training of said base pathway using said plurality of unlabeled video samples at said first framerate, and said training of said auxiliary pathway using said plurality of unlabeled video samples at said second framerate, result in a trained computerized two-pathway video action recognition model;
categorizing a candidate video using the trained computerized two-pathway video action recognition model; and
storing the categorized candidate video in a computer-accessible video database system for information retrieval.

* * * * *